US006999454B1

(12) United States Patent
Crump

(10) Patent No.: US 6,999,454 B1
(45) Date of Patent: Feb. 14, 2006

(54) INFORMATION ROUTING SYSTEM AND APPARATUS

(75) Inventor: Richard H. Crump, Boston, MA (US)

(73) Assignee: Nortel Networks Limited, (CA)

( * ) Notice: Subject to any disclaimer, the term of this patent is extended or adjusted under 35 U.S.C. 154(b) by 911 days.

(21) Appl. No.: 10/052,128

(22) Filed: Jan. 17, 2002

Related U.S. Application Data

(60) Provisional application No. 60/267,861, filed on Feb. 9, 2001.

(51) Int. Cl.
H04L 12/28 (2006.01)
H04L 12/56 (2006.01)

(52) U.S. Cl. .................. 370/389; 370/473; 370/474; 712/1; 712/220; 712/223; 710/306; 709/238

(58) Field of Classification Search ............... 370/389, 370/473, 474, 351, 238, 241, 445, 254, 252, 370/469, 467, 230, 362, 364, 365, 401, 420, 370/421, 423, 256, 390, 432, 400, 466, 412, 370/463, 396, 910, 911, 395.1, 395.31; 709/230, 709/220, 249, 238, 201, 225, 229, 217, 219, 709/203, 251, 213; 710/100, 381, 301, 303, 710/74; 711/114, 100, 6; 712/1, 29, 33, 712/220, 200
See application file for complete search history.

(56) References Cited

U.S. PATENT DOCUMENTS

| | | | | |
|---|---|---|---|---|
| 6,021,132 A * | 2/2000 | Muller et al. | ............... | 370/412 |
| 6,061,362 A * | 5/2000 | Muller et al. | ............... | 370/463 |
| 6,118,776 A * | 9/2000 | Berman | ............... | 370/351 |
| 6,453,358 B1 * | 9/2002 | Michels et al. | ............... | 709/238 |
| 6,470,007 B1 * | 10/2002 | Berman | ............... | 370/351 |
| 6,553,408 B1 * | 4/2003 | Merrell et al. | ............... | 709/213 |
| 6,640,278 B1 * | 10/2003 | Nolan et al. | ............... | 711/6 |
| 6,654,830 B1 * | 11/2003 | Taylor et al. | ............... | 710/74 |
| 6,725,310 B1 * | 4/2004 | Shoobe et al. | ............... | 710/303 |
| 6,744,783 B1 * | 6/2004 | Tzeng | ............... | 370/469 |
| 6,769,025 B1 * | 7/2004 | Alles et al. | ............... | 709/225 |
| 6,788,649 B1 * | 9/2004 | Dugan et al. | ............... | 370/254 |
| 6,816,467 B1 * | 11/2004 | Muller et al. | ............... | 370/256 |
| 6,891,804 B1 * | 5/2005 | Hargrove | ............... | 370/254 |
| 6,904,053 B1 * | 6/2005 | Berman | ............... | 370/466 |
| 2002/0085500 A1 * | 7/2002 | Hargrove | ............... | 370/238 |
| 2003/0200370 A1 * | 10/2003 | Shoobe et al. | ............... | 710/303 |
| 2004/0225794 A1 * | 11/2004 | Thornton | ............... | 710/301 |

OTHER PUBLICATIONS

Hermelin, Extending the Number of IS-IS LSP Fragments Beyond the 256 Limit, draft-hermelin-ext-lsp-frags-02.txt, Aug. 2001.

(Continued)

Primary Examiner—Wellington Chin
Assistant Examiner—Jamal A. Fox
(74) Attorney, Agent, or Firm—Steubing McGuinness & Manaras LLP

(57) ABSTRACT

An information routing system and apparatus includes separate control and forwarding planes. The control plane is split into box management control functions and routing control functions. The box management control functions are isolated to a single processing card, while the routing control functions are distributed across multiple processing cards. The routing table is also distributed across multiple processing cards. The multiple processing cards are interconnected via a high-speed backplane bus for control plane traffic and by a fabric for forwarding plane traffic.

18 Claims, 12 Drawing Sheets

OTHER PUBLICATIONS

Haas et al., Definitions of Managed Objects for the Fourth Version of Border Gateway Protocol (BGP-4), draft-ietf-idr-bgp4-mib-07.txt, Network Working Group, Jul. 2001.

Telstra Corporation, Hourly BGP Table Report, http://www.telstra.net/ops/bgp, Mar. 25, 2001.

Light Reading, Internet Core Router Test, http://www.lightreading.com/document.asp?doc_id=4009, Mar. 6, 2001. (Test Methodology: http://www.networktest.com/LR_router_00/meth.html).

Berkowitz, Benchmarking Methodology For Exterior Routing Convergence, Draft RFC (draft-berkowitz-bgpcon-01.txt), Mar. 2000.

Maunder et al., Explicit Marking and Prioritized Treatment of Specific IGP Packets for Faster IGP Convergence and Improved Network Scalability and Stability, Draft RFC (draft-ietf-ospf-scalability-00.txt), Internet Activities Board, Mar. 2001.

Ahuja, Abha, Global Routing System Scaling Issues Presentation, NANOG 21, Merit Network, Feb. 18-20, 2001.

Parker et al., Short Adjacency Hold Times In IS-IS, RFC Draft (draft-parker-short-isis-hold-times-00.txt), Jul. 20, 2001.

Vohra et al., BGP Support For Four-Octet AS number Space, Draft RFC (draft-ietf-idr-as4bytes-04.txt), Sep. 2001.

Huston, Geoff, Architectural Requirements For Inter-Domain Routing in the Internet, Draft RFC (draft-iab-bgparch-02.txt), Sep. 25, 2001.

Rosen et al., BGP/MPLS VPNs, Draft RFC (draft-rosen-rfc2547bis-03.txt), Internet Activities Board, Feb. 2001.

Li, Tony, Hardware Implications of Internet Routing Table Growth Presentation, NANOG 21, Procket Networks, Feb. 18-20, 2001.

Rekhter et al., A Border Gateway Protocol 4, Draft RFC (draft-ietf-idr-bgp4-12.txt), Internet Activities Board, Jan. 2001.

Patel et al., Aspath Based Outbound Route Filter For BGP-4, Draft RFC (draft-keyur-bgp-aspath-orf-00.txt), Internet Activities Board, Dec. 2000.

Alaettinoglu et al., Towards Milli-Second IGP Convergence, draft-alaettinoglu-isis-convergence-00.txt, ps. 7, Nov. 22, 2000.

Ramachandra et al., Graceful Restart Mechanism For BGP, Draft RFC (draft-ietf-idr-restart-01.txt), Internet Activities Board, Jul. 2001.

Chen et al., Cooperative Route Filtering Capability For BGP-4, Draft RFC (draft-ietf-idr-route-filter-04.txt), Internet Activities Board, May 2002.

Chen et al., Address Prefix Based Outbound Route Filter For BGP-4, Draft RFC (draft-chen-bgp-prefix-orf-03.txt), Internet Activities Board, Oct. 2001.

Chen, Enke, Route Refresh Capability For BGP-4, RFC 2918, Internet Activities Board, Sep. 2000.

Rosen et al., BGP/MPLS VPNs, RFC 2547, Internet Activities Board, Mar. 1999.

Heffernan, Andy, Protection of BGP Sessions Via the TCP MD5 Signature Option, RFC 2385, Internet Activties Board, Aug. 1998.

Moy, John, OSPF Version 2, RFC 2328, Internet Activities Board, Apr. 1998.

Murphy et al., OSPF With Digital Signatures, RFC 2154, Internet Activties Board, Jun. 1997.

Baker et al., RIP-2 MD5 Authentication, RFC 2082, Internet Activities Board, Jan. 1997.

Malkin, Gary Scott, RIP Version 2: Carrying Additional Information, RFC 1388, Internet Activities Board, Jan. 1993.

Rivest, Ronald L., The MD5 Message-Digest Algorithm, RFC 1321, Internet Activities Board, Apr. 1992.

Callon, Ross, Use of OSI IS-IS for Routing in TCP/IP and Dual Environment, RFC 1195, Internet Activities Board, Dec. 1990.

* cited by examiner

INFORMATION ROUTING SYSTEM AND APPARATUS

PRIORITY

The present application claims priority from the U.S. Provisonal Patent Application No. 60/267,861 entitled Method for Routing Packets in a Communication Network, filed on Feb. 9, 2001 in the name of Richard H. Crump, which is hereby incorporated herein by reference in its entirety.

FIELD OF THE INVENTION

The present invention relates generally to communication networking, and more particularly to routing information in a communication network.

REFERENCES

The following documents are referenced throughout the specification using the corresponding reference number in brackets, and are hereby incorporated herein by reference in their entireties:

[1] Ahuja, Abha, Global Routing System Scaling Issues Presentation, NANOG 21, Merit Network, Feb. 18–20, 2001.
[2] Alaettinoglu, Cengiz, etc., Towards Milli-Second IGP Convergence, RFC Draft (draft-alaettinoglu-isis-convergence-00), Internet Activities Board, November 2000.
[3] Baker, Fred and Randall Atkinson, RIP-2 MD5 Authentication, RFC 2082, Internet Activities Board, January 1997.
[4] Berkowitz, Howard, Benchmarking Methodology For Exterior Routing Convergence, Draft RFC (draft-berkowitz-bgpcon-03.txt), Internet Activities Board, March 2001.
[5] Callon, Ross, Use Of OSI IS-IS For Routing In TCP/IP and Dual Environment, RFC 1195, Internet Activities Board, December 1990.
[6] Chen, Enke, Route Refresh Capability For BGP-4, RFC 2918, Internet Activities Board, September 2000.
[7] Chen, Enke and Srihari Ramachandra, Address Prefix Based Outbound Route Filter For BGP-4, Draft RFC (draft-chen-bgp-prefix-orf-01.txt), Internet Activities Board, October 2000.
[8] Chen, Enke and Yakov Rekhter, Cooperative Route Filtering Capability For BGP, Draft RFC (draft-ietf-idr-route-filter-02.txt), Internet Activities Board, November 2000.
[12] Heffernan, Andy, Protection Of BGP Sessions Via The TCP MD5 Signature Option, RFC 2385, Internet Activities Board, August 1998.
[14] Huston, Geoff, Architectural Requirements For Inter-Domain Routing In The Internet, Draft RFC (draft-iab-bgparch-00.txt), Internet Activities Board, February 2001.
[15] Li, Tony, Hardware Implications Of Internet Routing Table Growth Presentation, NANOG 21, Procket Networks, February 18–20, 2001.
[16] Light Reading, Internet Core Router Test, http://www.lightreading.com/document.asp?doc_id=4009 and orioles:/vol/vol1/ws/rte2/harpoon/doc/zaba/lightReading.ps, Mar. 6, 2001. (Test Methodology: http://www.network-test.com/LR_router_00/meth.html)
[17] Malkin, Gary Scott, RIP Version 2: Carrying Additional Information, RFC 1388, Internet Activities Board, January 1993.
[18] Maunder, Anurag S. and Gagan Choudhury, Explicit Marking and Prioritized Treatment of Specific IGP Packets for Faster IGP Convergence and Improved Network Scalability and Stability, Draft RFC (draft-ietf-ospf-scalability-00.txt), Internet Activities Board, March 2001.
[19] Moy, John, OSPF Version 2, RFC 2328, Internet Activities Board, April 1998.
[20] Murphy, Sandra, etc., OSPF With Digital Signatures, RFC 2154, Internet Activities Board, June 1997.
[21] Parker, Jeff, et al., Short Adjacency Hold Times In IS-IS, RFC Draft (draft-parker-short-isis-hold-times-00.txt), Internet Activities Board, February 2001.
[22] Patel, Keyur and Susan Hares, AS_Path Based Outbound Route Filter For BGP-4, Draft RFC (draft-keyur-bgp-aspath-orf-00.txt), Internet Activities Board, December 2000.
[23] Ramachandra, Srihari, et al., Graceful Restart Mechanism For BGP, Draft RFC (draft-ietf-idr-restart-04.txt), Internet Activities Board, November 2000.
[24] Rekhter, Yakov and Tony Li, A Border Gateway Protocol 4, Draft RFC (draft-ietf-idr-bgp4-12.txt), Internet Activities Board, January 2001.
[25] Rivest, Ronald L., The MD5 Message-Digest Algorithm, RFC 1321, Internet Activities Board, April 1992.
[26] Rosen, Eric C. and Yakov Rekhter, BGP/MPLS VPNs, RFC 2547, Internet Activities Board, March 1999.
[27] Rosen, Eric C., etc., BGP/MPLS VPNs, Draft RFC (draft-rosen-rfc2547bis-03.txt), Internet Activities Board, February 2001.
[28] Telstra Corporation, Hourly BGP Table Report, http://www.telstra.net/ops/bgp, Mar. 25, 2001.
[29] Vohra, Quaizar and Enke Chen, BGP Support For Four-Octet AS number Space, Draft RFC (draft-ietf-idr-as4 bytes-01.txt), Internet Activities Board, February 2001.

BACKGROUND OF THE INVENTION

In today's information age, information is often carried over a communication network. One key component in modern communication networks is the router. A router is used to forward information packets in the communication network.

Routers implement various protocols for determining routes in the communication network. The routers then use these routes to set up forwarding tables that are used for forwarding information packets. For convenience, the logic that determines and distributes routes within the router is often referred to as the "control plane" of the router, while the logic that forwards information packets within the router is often referred to as the "forwarding plane" of the router.

An ever-increasing demand for communication services has driven the advancement of routing technologies. Routing technologies has evolved to include enhanced routing protocols, faster hardware components, and more advanced software implementations. There have been at least three distinct generations of routing models.

A first generation routing model, an example of which is shown in FIG. 1, generally supports a relatively few low-speed interfaces (e.g., 10 Mbps Ethernet, 4 Mbps Token Ring, 56 Kbps synchronous) and a limited number of routing protocols (e.g., RIP, EGP). The control plane and forwarding plane are typically combined in a single executable software image running on a single processing card within the router. A centralized routing table is typically used for storing network routes.

A second generation routing model, an example of which is shown in FIG. 2, generally supports a larger number of higher-speed interfaces (e.g., T1, fractional T1, FDDI), has higher packet throughput rates, and supports a large number of routing protocols (e.g., RIP, BGP, OSPF, IS-IS, XNS, VINES, APPN, AppleTalk, DECnet, IPX, OSI). The control plane and forwarding plane are typically combined in a single executable software image distributed across multiple processing cards. The routing table is also distributed across multiple processing cards.

A third generation routing model generally supports even higher-speed interfaces (e.g., OC-3, OC-12, OC-48), has even higher packet throughput rates, is capable of forwarding information packets at full line rate, and supports a limited number of routing protocols (e.g., RIP2, BGP, OSPF, IS-IS). The control plane and forwarding plane are typically split into two separate executable software images. The forwarding plane is typically distributed across multiple processing cards (referred to as "forwarding processor cards"). The control plane is typically isolated to a single processing card (referred to as the "service processor card"). A centralized routing table is typically used for storing network routes. In one variation of the third generation model, an example of which is shown in FIG. 3, a separate low-speed bus is used for carrying control plane traffic between the service processor card and the forwarding processor cards so that the control plane traffic does not interfere with the forwarding plane traffic. In another variation of the third generation model, an example of which is shown in FIG. 4, the control plane is isolated to a completely separate server connected to the router's main elements by a Gigabit Ethernet link. In yet another variation of the third generation model, an example of which is shown in FIG. 5, the control plane is not only isolated to a single service processor card, but is further split into routing control and box management control images that run on separate processors on the service processor card.

In today's modern communication networks, which generally use third generation routers, various factors affect router performance.

One factor that affects router performance is the growth of the Internet. The Internet has seen substantial growth, due in part to the increasing use of the Internet (and specifically the World Wide Web) by businesses and individuals and the growing number of Internet Service Providers (ISPs). With this Internet growth, there has been a substantial increase in the size of the global Border Gateway Protocol (BGP) routing table. Furthermore, each ISP needs at least one Autonomous System (AS) number, and many ISPs provide redundant Network Access Points (referred to as "multi-homing"). This has resulted in a substantial increase in usage of the Autonomous System (AS) number space, and there is an effort under way to expand the AS number space [29]. There are many signs that the Internet will continue to grow at a fast pace [28].

As a result of this Internet growth, it is common for routers to experience a large number of route changes. For example, a typical ISP experiences over 9000 route changes to its Routing Information Base (RIB) each day, with roughly 327 routes disappearing or deleted, 938 new routes added, 7842 routes modified, and 61,934 routes remaining unchanged [1]. These route changes place a huge burden on the network routers that will only get worse as the Internet grows.

Another factor that affects router performance is the growing use of Virtual Private Networks (VPNs). VPNs allow service providers to provide IP backbone services to their clients [26] [27]. Client sites connect to the common backbone network, and are grouped into a number of subsets, where each subset is a VPN. Two sites may have IP interconnectivity over the backbone only if both sites are members of the same VPN (i.e., each VPN is a separate routing domain). Within a VPN, Multiprotocol Label Switching (MPLS) is used to forward packets over the common IP backbone, and MBGP is used to distribute VPN routes over the backbone. At this time, service providers would like VPN edge routers to support up to 1500 VPN Virtual Routing and Forwarding (VFR) tables with an average size of 2000 routes each.

Yet another factor that affects router performance is the need for faster routing protocol convergence. Among other things, faster routing protocol convergence increases network reliability by reducing periods during which routes are unavailable, enables streaming data applications such as Voice-over-IF by reducing the number of dropped packets due to convergence, and eliminates the need to use more expensive and complex layer 2 protection schemes such as SONET [4] [16]. Changes to IS-IS [2] [21] and OSPF [18] are proposed for achieving faster IGP convergence times, specifically by running faster Hello timers.

Still another factor that affects router performance is the adoption of various new routing technologies. These new routing technologies include outbound route filters [7] [8] [22] that allow a local BGP peer to send to its remote peer a set of route filters that the remote peer uses to filter its outbound routing updates, route refresh [6] that allows a local BGP peer to dynamically request a re-advertisement of its remote peer's routes, graceful restart [23] that allows a local BGP peer to retain routing information across a TCP session reset, and routing table protection that improves protection of the routing table from bogus route updates and from attacks from unauthorized routers, for example, using MD5 signatures between routing pairs [3] [12] [20] [25].

Still another factor that affects router performance is control plane scaling [14] [15]. One reason why today's routers do not scale well is that control plane processing grows at a slower rate than packet processing capability. As the packet processing capability is increased, with additional forwarding processor cards, the control plane processing from the service processor card needs to be shared equally among the forwarding processor cards. This means that any one forwarding processor card gets a smaller share of the control plane processing power as forwarding processor cards are added. As a result, the best level of performance is achieved with the minimum router configuration, when the ratio between control plane processing power and packet processing capability is the lowest.

SUMMARY OF THE INVENTION

In accordance with one aspect of the invention, an information routing system and apparatus includes separate control and forwarding planes. The control plane is split into box management control functions and routing control functions. The box management control functions are isolated to a single processing card, while the routing control functions are distributed across multiple processing cards. The routing table is also distributed across multiple processing cards. The multiple processing cards are interconnected via a high-speed backplane bus for control plane traffic and by a fabric for forwarding plane traffic.

DETAILED DESCRIPTION OF A PREFERRED EMBODIMENT

An architecture for a fourth generation router is presented. In this architecture, the control plane and forwarding plane are separated and are distributed across multiple processing cards. The control plane is further separated into routing control and box management control functions. The box management control functions are isolated to a single processing card, while the routing control functions are distributed across multiple processing cards. The routing table is also distributed across multiple processing cards. The multiple processing cards are interconnected via a high-speed backplane bus for control plane traffic and by a fabric for forwarding plane traffic.

In a typical embodiment of the present invention, the high-speed backplane bus for control plane traffic is a 1 Gigabit Ethernet backplane bus, and the fabric is a 640 Gigabit routing fabric. The processing cards typically utilize high-speed processors, such as 1 GHz SiByte processors, and run a commercial operating system, such as netBSD.

These fourth generation routers typically support a larger number of interfaces, higher speed interfaces (e.g., 10 Gigabit Ethernet, OC-192, OC-768), higher packet throughput rates, and a limited number of routing protocols (e.g., RIP2 [17], BGP [24], OSPF [19], IS-IS [5]).

Figure 1:
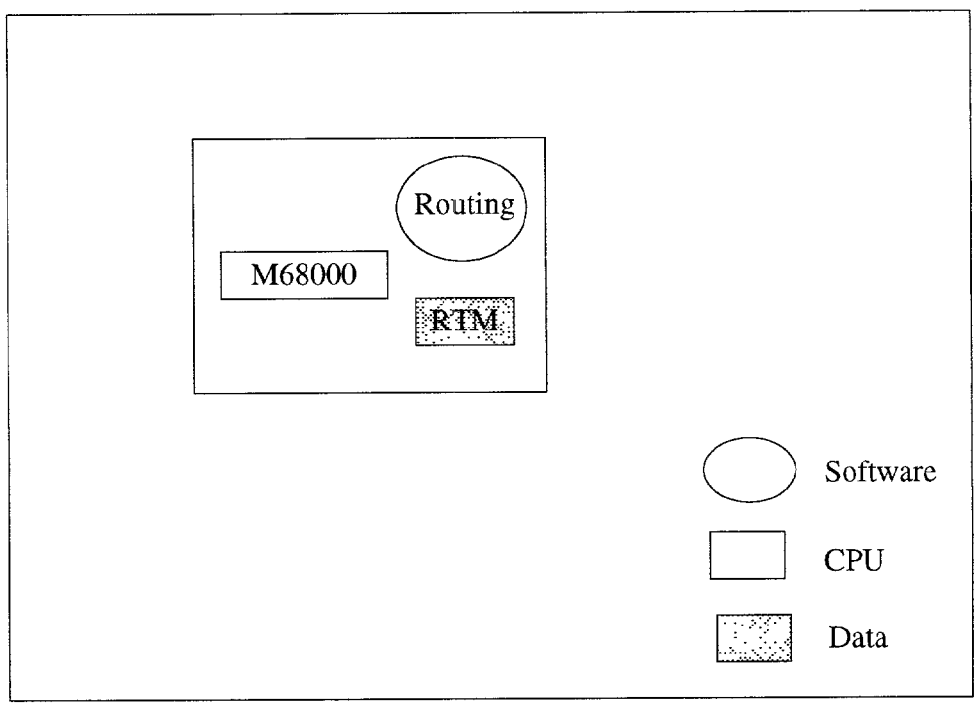
FIG. 1 is a block diagram showing an exemplary first generation router architecture as known in the art.
Figure 2:
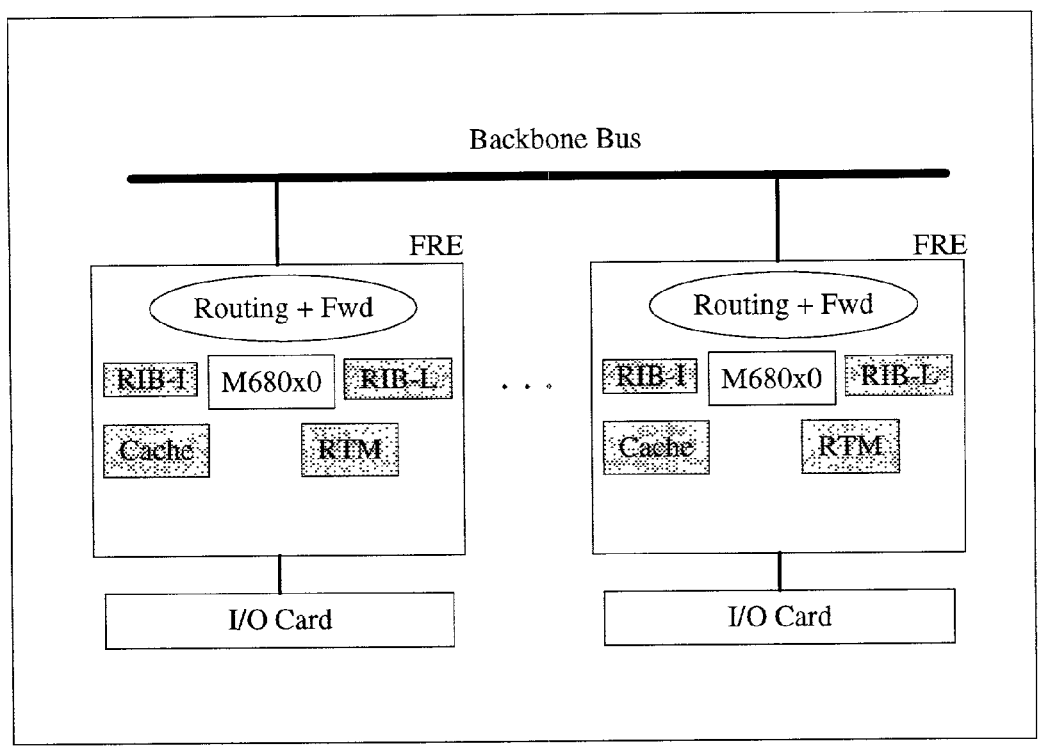
FIG. 2 is a block diagram showing an exemplary second generation router architecture as known in the art.
Figure 3:
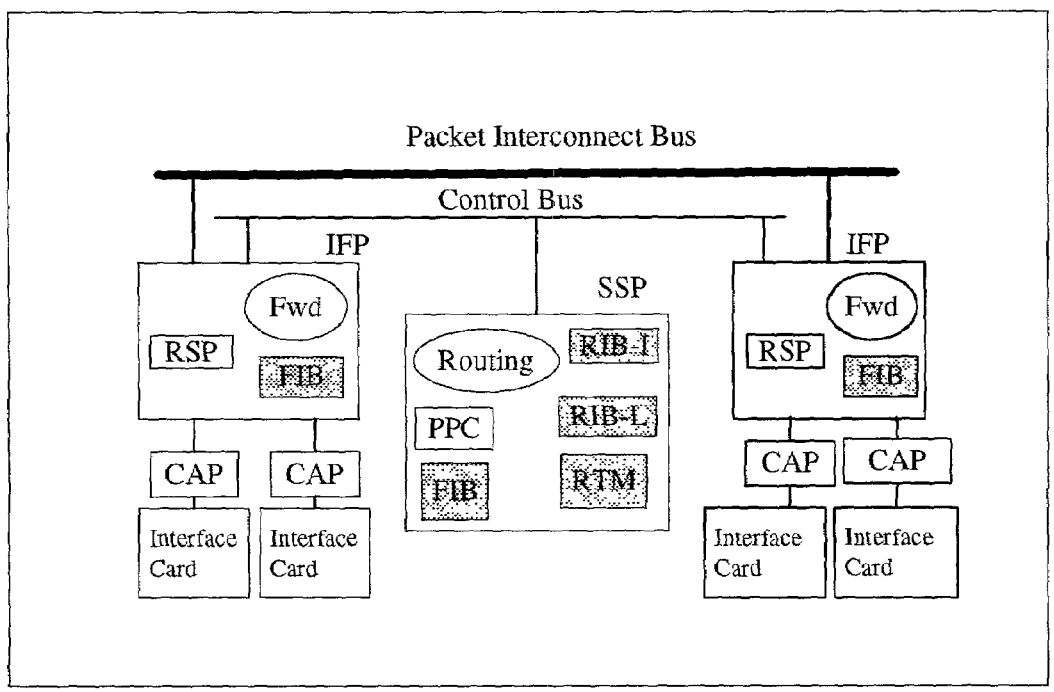
FIG. 3 is a block diagram showing an exemplary third generation router architecture in which a separate low-speed bus is used for carrying control plane traffic between router cards, as known in the art.
Figure 4:
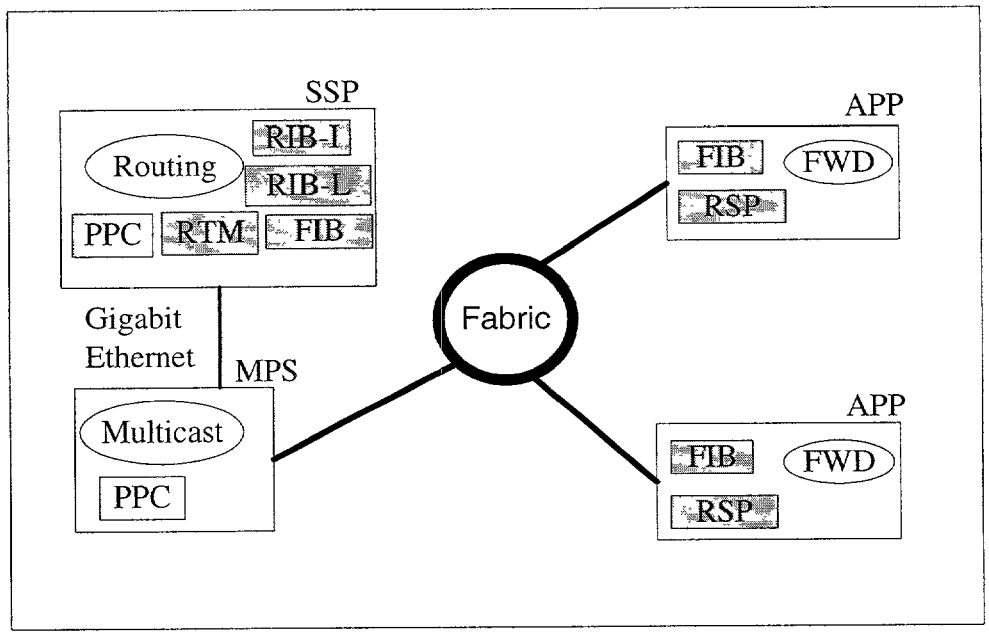
FIG. 4 is a block diagram showing an exemplary third generation router architecture in which the control plane is isolated to a separate server, as known in the art.
Figure 5:
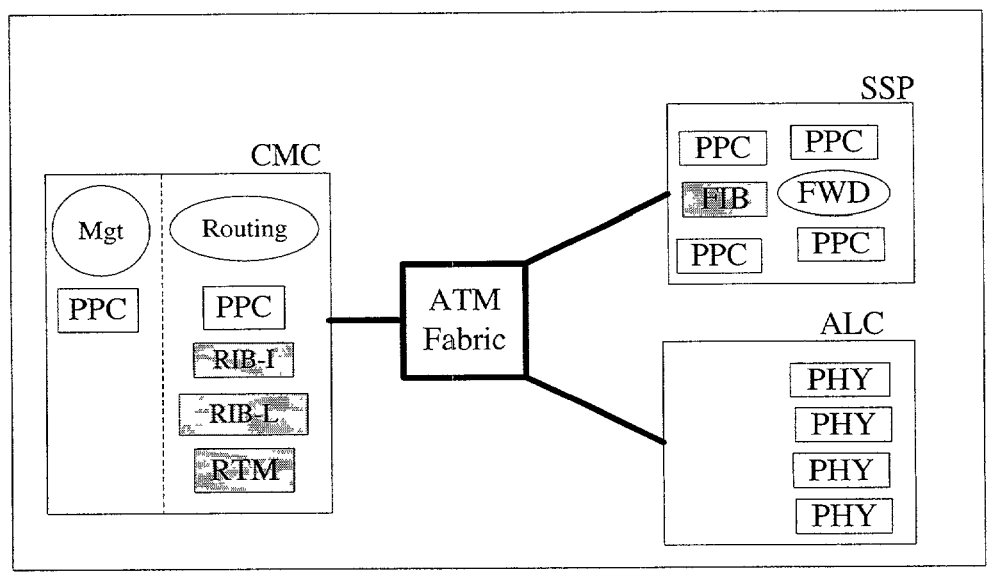
FIG. 5 is a block diagram showing an exemplary third generation router architecture in which the control plane is isolated to a single router card and is split into routing control and box management control images, as known in the art.
Figure 6:
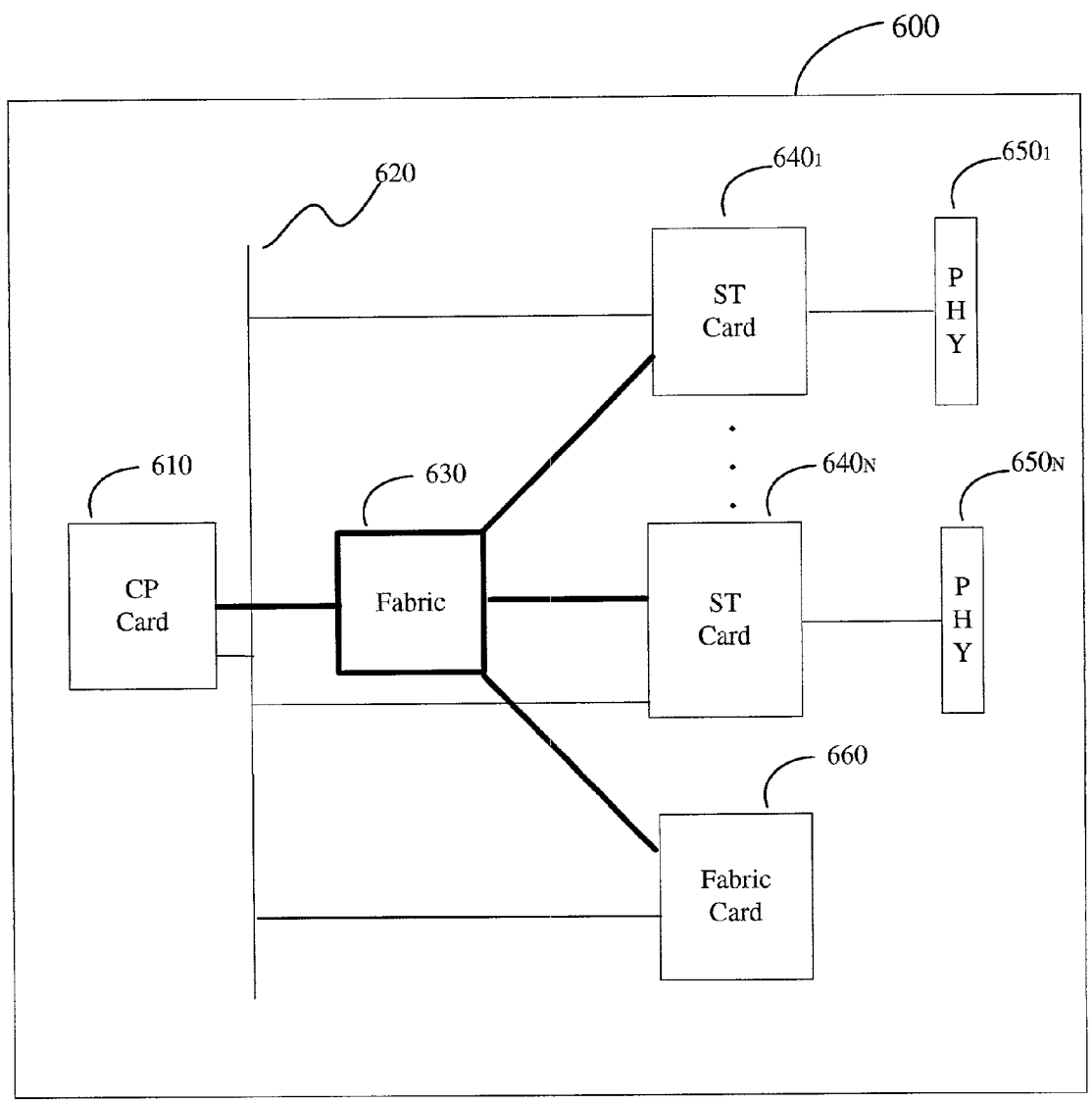
FIG. 6 is a schematic block diagram showing the relevant components of an exemplary fourth generation router in accordance with an embodiment of the present invention.

FIG. 6 is a schematic block diagram showing the relevant components of an exemplary fourth generation router 600. Among other things, the fourth generation router 600 includes a control processor (CP) card 610, a 1 Gigabit Ethernet backplane bus 620, a 640 Gigabit routing fabric 630, a number of service termination (ST) cards $640_1$-$640_N$ (referred to hereinafter collectively as ST cards 640 and individually as ST card 640), a number of physical (PHY) interfaces $650_1$-$650_N$ (referred to hereinafter collectively as PHY interfaces 650 and individually as PHY card 650), and a fabric card 660. The CP card 610, the ST cards 640, and the fabric card 660 are interconnected via the 1 Gigabit Ethernet backplane bus 620 and the 640 Gigabit routing fabric 630. The 1 Gigabit Ethernet backplane bus 620 is used for control plane traffic, while the 640 Gigabit routing fabric 630 is used for forwarding plane traffic. Each of the ST cards 640 is associated with a corresponding PHY interface 650. A typical fourth generation router might include two CP cards, up to sixteen ST cards, and three fabric cards.

Within the fourth generation router 600, the control plane is separated into routing control (Routing) and box management control (MGT) functions. The MGT functions are substantially isolated to the CP card 610, while the Routing functions and distributed routing table manager (DRTM) are distributed across the CP card 610 and the ST cards 640. Each ST card 640 typically includes hardware components for performing high-speed information forwarding as well as a high-speed processor for running the control plane functions. In this way, the fourth generation router 600 supports a distributed control plane that runs independently of the forwarding plane, and the control plane is scalable as control plane processing power is increased with each added ST card.

Figure 7:
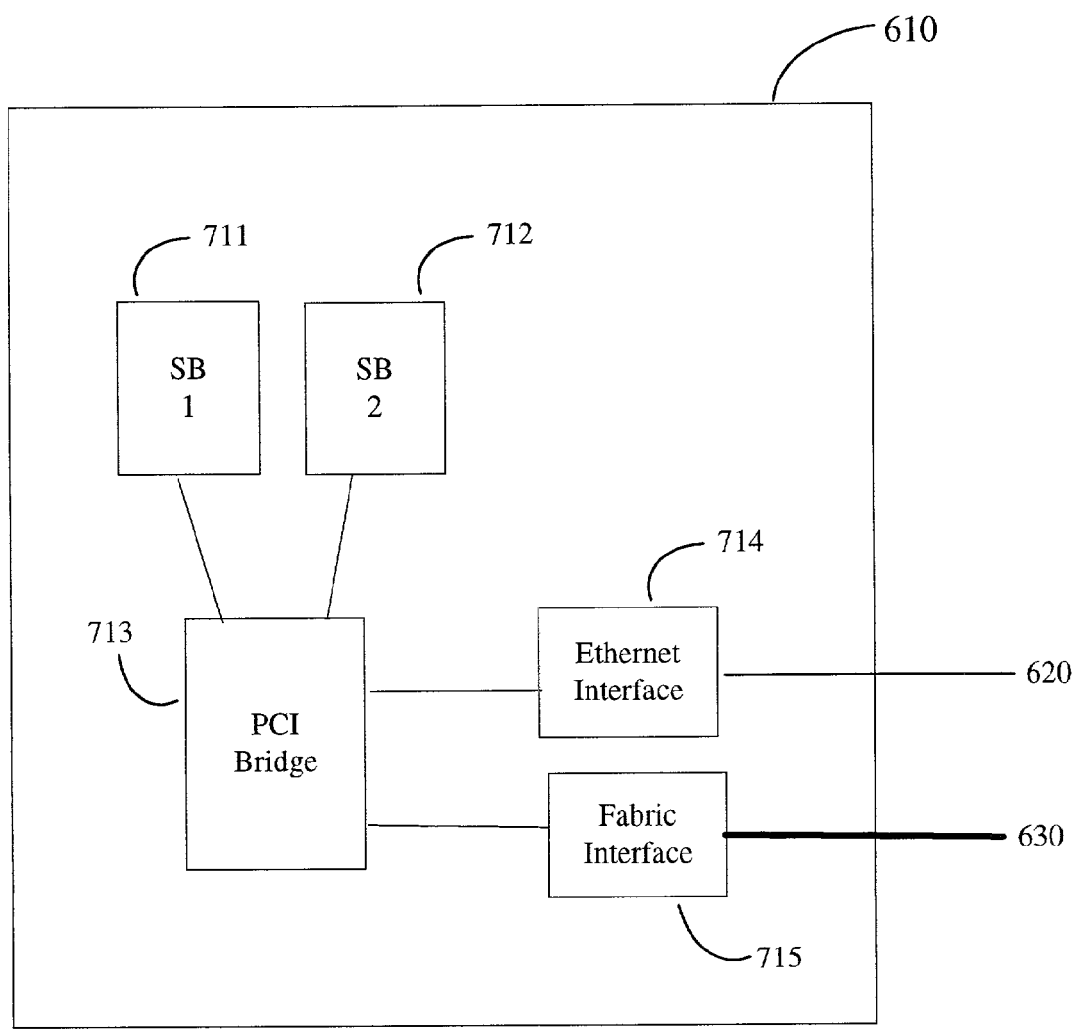
FIG. 7 is a schematic block diagram showing the relevant components of an exemplary control processor card in accordance with an embodiment of the present invention.

FIG. 7 is a schematic block diagram showing the relevant components of the CP card 610. Among other things, the CP card 610 includes two SiByte (SB) processors 711 and 712, a PCI bridge 713, an Ethernet interface 714, and a fabric interface 715. The PCI bridge 713 couples the processors 711 and 712, the Ethernet interface 714, and the fabric interface 715 via a PCI bus. The Ethernet interface 714 couples the CP card 610 to the 1 Gigabit Ethernet backplane bus 620 for sending and receiving control plane traffic. The fabric interface 715 couples the CP card 610 to the 640 Gigabit routing fabric 630 for sending and receiving forwarding plane traffic.

Figure 8:
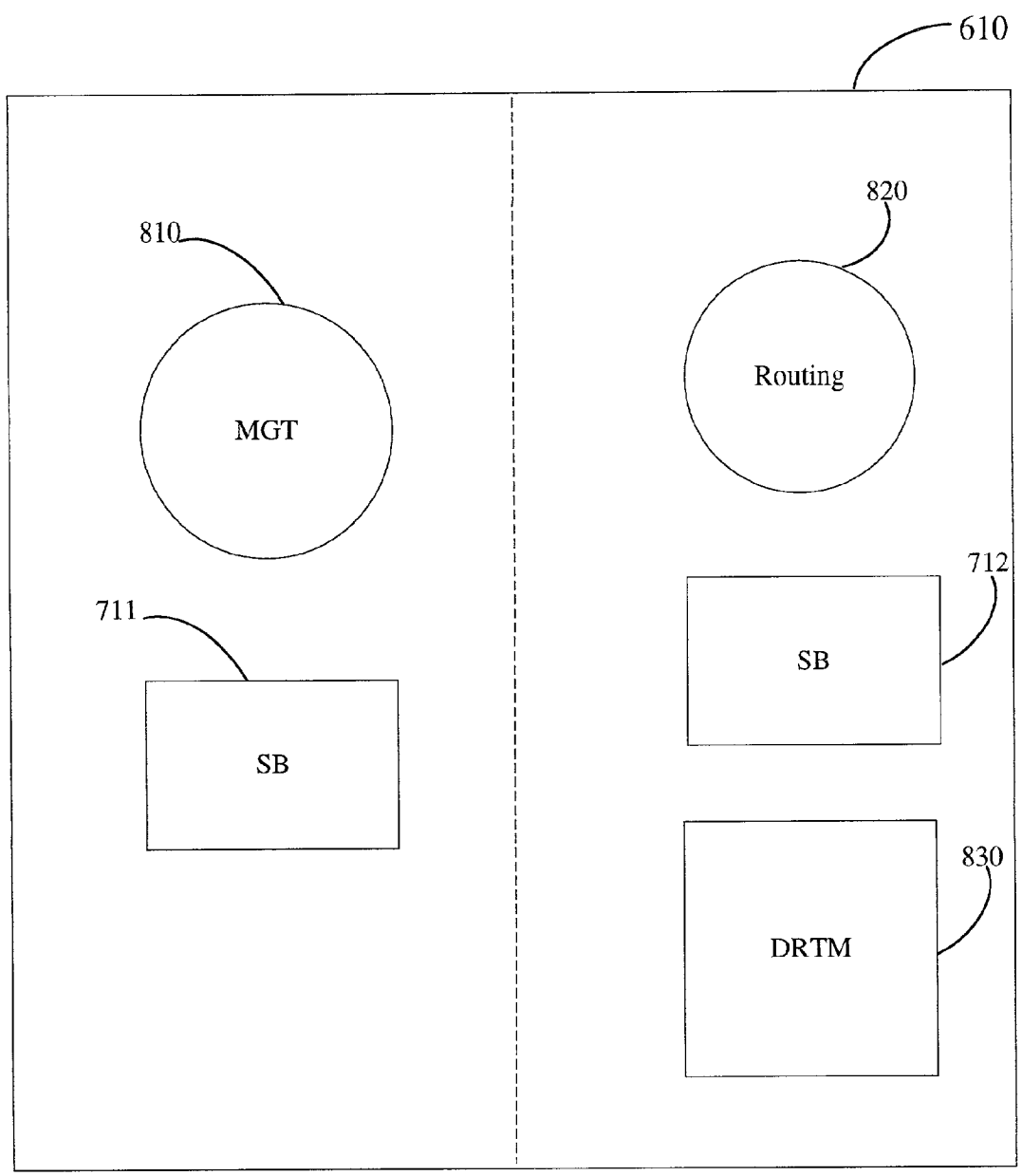
FIG. 8 is a block diagram showing the distribution of control plane functions on the control processor card in accordance with an embodiment of the present invention.

FIG. 8 is a block diagram showing the distribution of control plane functions on the CP card 610. As described above, the control plane is separated into Routing and MGT functions. The MGT functions 810 run on the SB processor 711, while the Routing functions 820 and DRTM functions 830 run on the SB processor 712. By running the MGT functions 810 on a different processor than the Routing functions 820 and DRTM functions 830, the MGT functions 810 do not diminish the processing power used for the Routing functions 820 and DRTM functions 830.

Figure 9:
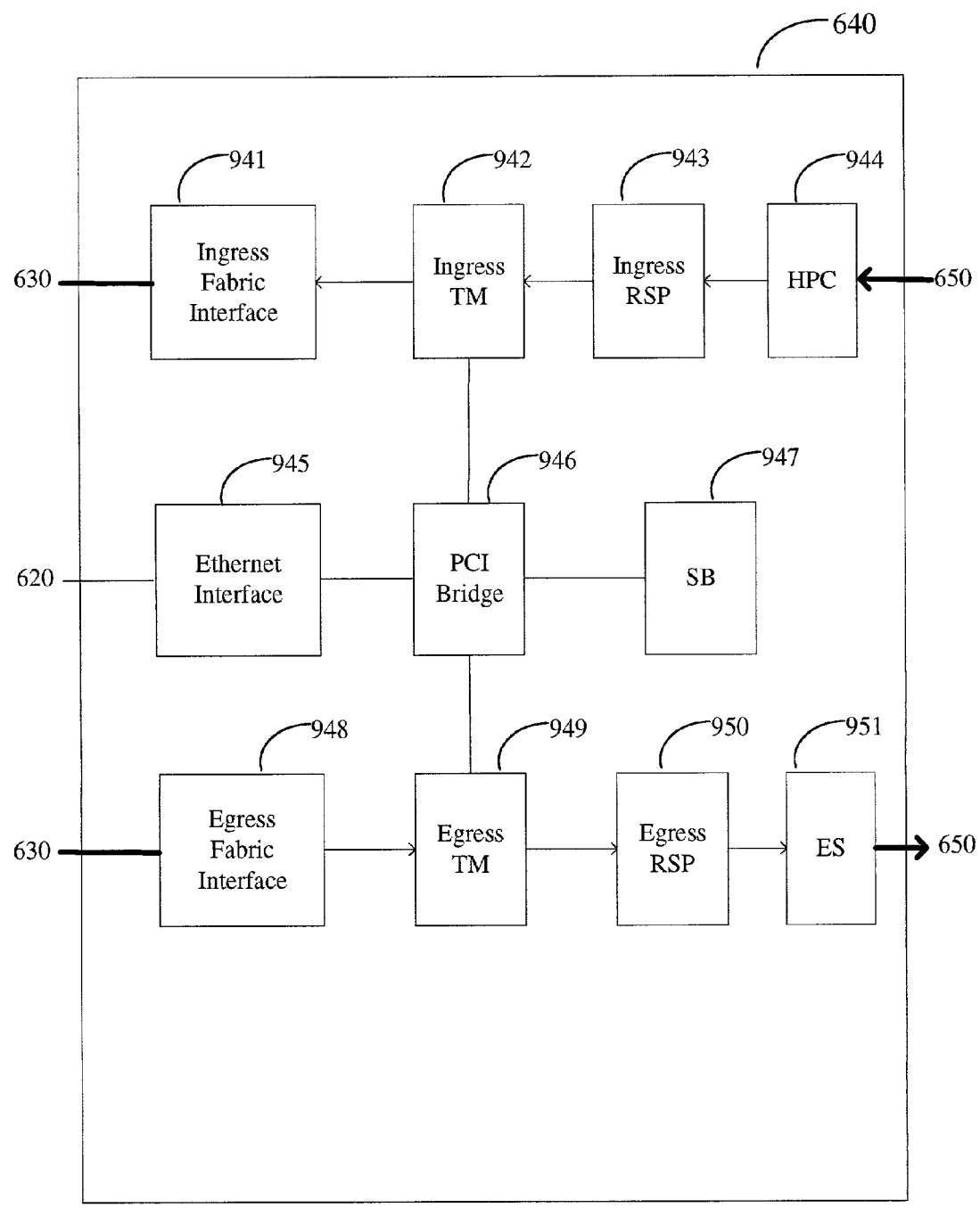
FIG. 9 is a schematic block diagram showing the relevant components of an exemplary service termination card in accordance with an embodiment of the present invention.

FIG. 9 is a schematic block diagram showing the relevant components of a ST card 640. Among other things, the ST card 640 includes an ingress information path including ingress fabric interface 941, ingress traffic manager (TM) 942, ingress route switch processor (RSP) 943, and hardware pre-classifier (HPC) 944; an egress information path including egress fabric interface 948, egress TM 949, egress RSP 950, and egress shaper (ES) 951; an Ethernet interface 945; a PCI bridge 946; and a SiByte (SB) processor 947. The RSPs 943 and 950 are Application Specific Integrated Circuit (ASIC) devices that perform forwarding plane routing/switching based upon routing/forwarding information configured by the control plane. The PCI bridge 946 couples the traffic managers 942 and 949, the Ethernet interface 945, and the SB processor 947 via a PCI bus. The Ethernet interface 945 couples the ST card 640 to the 1 Gigabit Ethernet backplane bus 620 for sending and receiving control plane traffic. The ingress fabric interface 941 and egress fabric interface 948 couple the ST card 640 to the 640 Gigabit routing fabric 630 for sending and receiving information over the 640 Gigabit routing fabric 630, respectively. Specifically, information received from the PHY interface 650 is processed successively by the HPC 944 and the ingress RSP 943, which determines, among other things, whether the information needs to be forwarded over the 640 Gigabit routing fabric 630. Assuming the information needs to be forwarded over the 640 Gigabit routing fabric 630, then the ingress RSP 943 forwards the information to the ingress TM 942, which in turn forwards the information over the 640 Gigabit routing fabric 630 via the ingress fabric interface 941. On the other hand, information received over the 640 Gigabit routing fabric 630 via the egress fabric interface 948 is processed by the egress TM 949 and the egress RSP 950, which determines, among other things, whether the information needs to be forwarded over the PHY interface 650. Assuming the information needs to be forwarded over the PHY interface 650, then the egress RSP 950 forwards the information over the PHY interface 650 via the ES 951.

Figure 10:
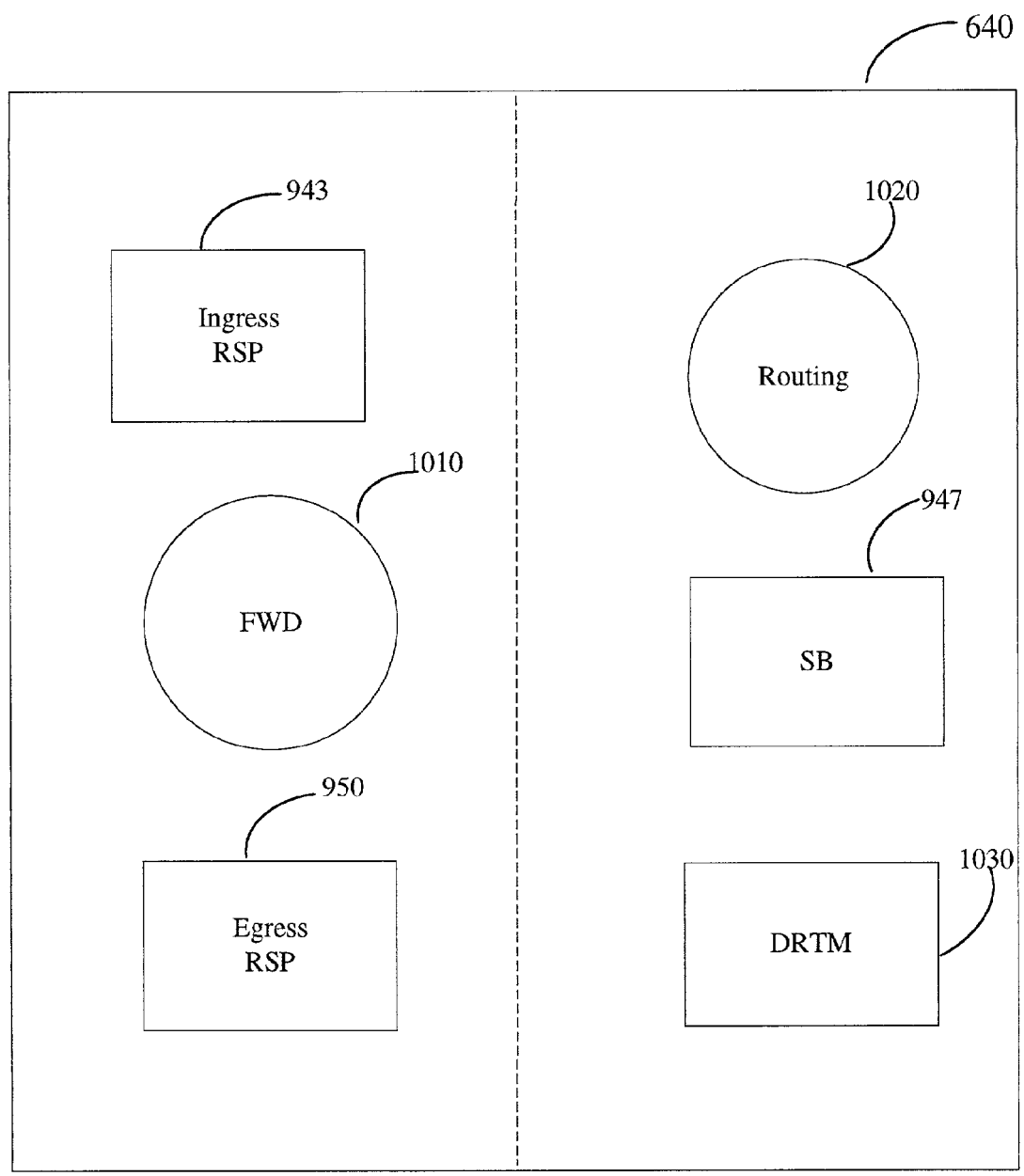
FIG. 10 is a block diagram showing the distribution of functions on the service termination card in accordance with an embodiment of the present invention.

FIG. 10 is a block diagram showing the distribution of functions on the ST card 640. As described above, the control plane Routing and DRTM functions are distributed across the CP card 610 and the ST cards 640. On the ST card 640, the control plane Routing and DRTM functions are isolated from the information forwarding functions. The Routing functions 1020 and DRTM functions 1030 run on the SB processor 947, while the forwarding functions 1010 are substantially handled in hardware, and, in particular, by the ingress RSP 943 and the egress RSP 950. By separating the control plane functions from the forwarding plane functions on the ST card 640, the forwarding plane functions do not diminish the processing power used for the Routing functions 1020 and the DRTM functions 1030.

Figure 11:
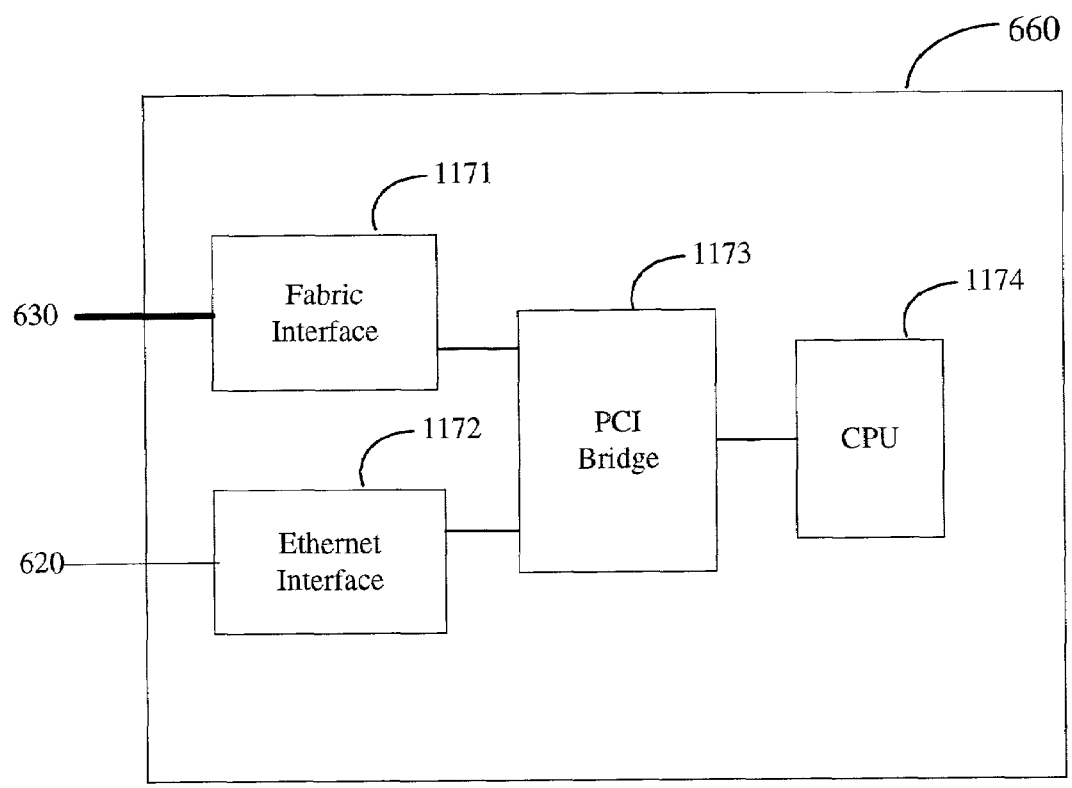
FIG. 11 is a schematic block diagram showing the relevant components of an exemplary fabric card in accordance with an embodiment of the present invention.

FIG. 11 is a schematic block diagram showing the relevant components of the fabric card 660. Among other things, the fabric card 660 includes a fabric interface 1171, an Ethernet interface 1172, a PCI bridge 1173, and a processor (CPU) 1174. The PCI bridge 1173 couples the Ethernet interface 1171, the fabric interface 1172, and the CPU 1174 via a PCI bus. The Ethernet interface 1171 couples the fabric card 660 to the 1 Gigabit Ethernet backplane bus 620. The fabric interface 1172 couples the fabric card 660 to the 640 Gigabit routing fabric 630. The fabric card 660 manages the 640 Gigabit routing fabric 630, and generally performs no control plane or forwarding plane functionality.

The DRTM works generally as follows. When an interface on a ST card is configured, a number of attributes are configured for the interface. These attributes include a routing table type (classical IP, virtual router, or VPN), a routing table instance, and a routing protocol. The routing protocol determines routes, and presents the routes to the DRTM. The DRTM in turn distributes the routes as necessary to other ST cards. Generally speaking, the DRTM broadcasts a route to the other ST cards when the route is a new local best route or when the route transitions from a non-best route to a best route.

Figure 12:
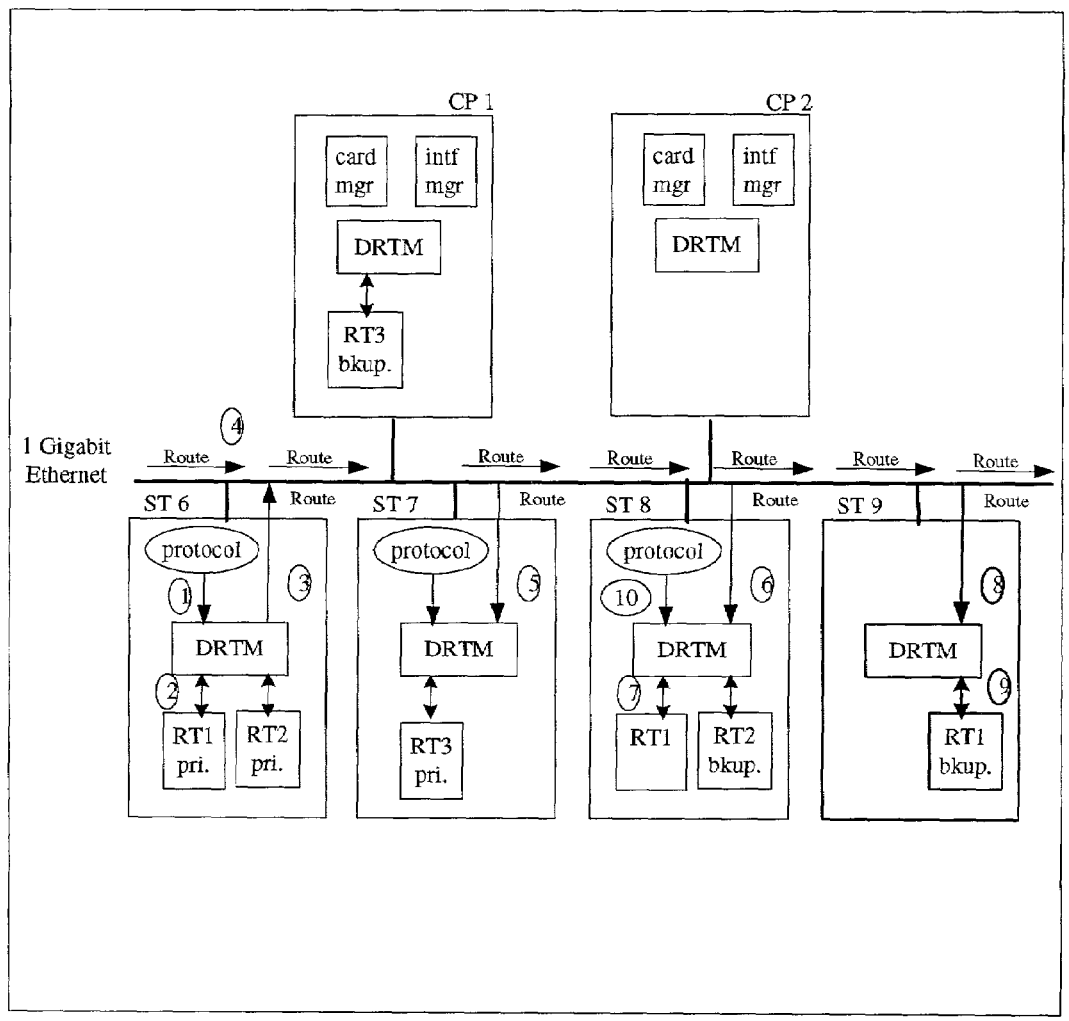
FIG. 12 is a block diagram showing an exemplary fourth generation router including two control processor cards and four service termination cards as well as exemplary routing tables maintained by the four service termination cards in accordance with an embodiment of the present invention.

The operation of the DRTM can be demonstrated by example. FIG. 12 shows two CP cards (CP1 and CP2) and four ST cards (ST6, ST7, ST8, and ST9) of an exemplary fourth generation router. The ST cards maintain various routing tables. Specifically, ST cards ST6, ST8, and ST9 maintain routing table RT1, ST cards ST6, and ST8 maintain routing table RT2, and ST card ST7 maintains routing table RT3. For the sake of discussion, the following are exemplary routing tables maintained by the various ST cards. Each entry in a routing table includes, among other things, a prefix, a card number, and interface number, and a route type (B=BGP, I=IS-IS, O=OSPF, R=RIP).

ST6-Routing Table RT1:

| Prefix | Card | Interface | Type |
| --- | --- | --- | --- |
| 192.32.13.0 | 6 | 1 | O |
| 192.32.14.0 | 6 | 2 | B |
| 192.32.15.0 | 6 | 1 | O |

ST6-Routing Table RT2:

| Prefix | Card | Interface | Type |
| --- | --- | --- | --- |
| 192.32.13.0 | 6 | 2 | O |
| 192.32.14.0 | 6 | 2 | O |
| 192.32.15.0 | 6 | 2 | O |
| 192.32.15.0 | 8 | 1 | B |

ST7-Routing Table RT3:

| Prefix | Card | Interface | Type |
| --- | --- | --- | --- |
| 192.66.63.0 | 7 | 1 | R |
| 192.66.64.0 | 7 | 1 | R |
| 192.66.65.0 | 7 | 1 | R |
| 192.66.66.0 | 7 | 1 | R |

ST8-Routing Table RT1:

| Prefix | Card | Interface | Type |
| --- | --- | --- | --- |
| 192.32.13.0 | 6 | 1 | O |
| 192.32.14.0 | 8 | 2 | B |
| 192.32.15.0 | 6 | 1 | O |
| 192.32.15.0 | 8 | 2 | B |

ST8-Routing Table RT2:

| Prefix | Card | Interface | Type |
| --- | --- | --- | --- |
| 192.32.13.0 | 6 | 2 | O |
| 192.32.14.0 | 6 | 2 | O |
| 192.32.15.0 | 6 | 2 | O |
| 192.32.15.0 | 8 | 1 | B |

ST9-Routing Table RT1:

| Prefix | Card | Interface | Type |
|---|---|---|---|
| 192.32.13.0 | 6 | 1 | O |
| 192.32.14.0 | 8 | 2 | B |
| 192.32.15.0 | 6 | 1 | O |

This example follows the flow of OSPF on ST 6. For convenience, various events are enumerated and depicted by an event number enclosed within a circle. This example demonstrates seven distinct cases, namely a new local best route (case 1); a new local non-best route (case 2); a new remote best route (case 3); a new remote non-best route (case 4); an old local non-best route becomes best route (case 5); an old remote non-best route becomes best route (case 6); and a route for an unsupported routing table (case 7). In the described embodiment, each ST card saves all routes that it receives, including non-best routes that it will not immediately use. Then, if a best route becomes unusable, the ST card can quickly switch to another route. This approach provides for fast re-convergence following a route change at the expense of high memory utilization.

Case 1: New Local Best Route

The OSPF protocol running on interface 1 of ST 6 submits routes 192.32.13.0 and 192.32.15.0 to the DRTM (event 1). The DRTM in turn installs the routes in routing table RT1 on ST 6 (event 2) and determines that the routes are new local best routes. The DRTM knows that ST 8 and ST 9 also maintain routing table RT1. Therefore, the DRTM creates an Update Route message including the two routes (event 3) and broadcasts the Update Route message over the control bus (event 4).

The flow continues in CASE 7.

Case 2: New Local Non-Best Route

Continuing from CASE 3, the BGP protocol running on interface 2 of ST 8 submits route 192.32.15.0 to the DRTM (event 10). The DRTM in turn installs the route in routing table RT1 on ST 8 and determines that the route is a new local non-best route. Because the route is a non-best route, the DRTM does not broadcast an Update Route message.

The flow continues in CASE 5.

Case 3: New Remote Best Route

Continuing from CASE 7, the DRTM on ST 8 receives the Update Route message including routes 192.32.13.0 and 192.32.15.0 from the control bus (event 6). The DRTM installs the routes in routing table RT1 on ST 8 (event 7) and determines that they are new remote best routes. Because the routes are remote best routes, the DRTM does not broadcast an Update Route message.

Likewise, the DRTM on ST 9 receives the Update Route message including routes 192.32.13.0 and 192.32.15.0 from the control bus (event 8). The DRTM installs the routes in routing table RT1 on ST 9 (event 9) and determines that they are new remote best routes. Because the routes are remote best routes, the DRTM does not broadcast an Update Route message.

The flow continues in CASE 2.

Case 4: New Remote Non-Best Route

The OSPF protocol running on interface 2 of ST 6 submits routes 192.32.13.0, 192.32.14.0, and 192.32.15.0 to the DRTM. The DRTM in turn installs the routes in routing table RT2 on ST 6 and determines that the routes are new local best routes. The DRTM knows that ST 8 also maintains routing table RT2. Therefore, the DRTM creates an Update Route message including the routes and broadcasts the Update Route message over the control bus.

At approximately the same time, the BGP protocol running on interface 1 of ST 8 submits route 192.32.15.0 to the DRTM. The DRTM in turn installs the route in routing table RT 2 on ST 8 and determines that the route is a new local best route. The DRTM knows that ST 6 also maintains routing table RT2. Therefore, the DRTM creates an Update Route message including the route and broadcasts the Update Route message over the control bus.

Since ST 6 and ST 8 both learned route 192.32.15.0 at approximately the same time, neither knows about the other's route (i.e., neither has received the other's Update Route message). Under this kind of race condition, one ST will receive a new remote non-best route and the other will receive a new remote best route.

In this example, ST 6 will receive the new remote non-best route. When the DRTM on ST 6 receives the Update Route message from ST 8 over the control bus, the DRTM installs the route in the routing table RT2 on ST 6 and determines that the route is a remote non-best route. Therefore, the DRTM does not broadcast an Update Route message.

ST 8 receives the new remote best route. When the DRTM on ST 8 receives the Update Route message from ST 6 over the control bus, the DRTM determines that the route is a new remote best route, since ST 6 is running OSPF and ST 8 is running BGP (i.e., OSPF routes are preferred over BGP routes). This situation is covered in CASE 3.

The flow continues in CASE 6.

Case 5: Old Local Non-Best Route Becomes Best Route

Continuing from CASE 2, the OSPF protocol running on interface 1 of ST 6 submits a withdrawal of route 192.32.15.0 to the DRTM. The DRTM in turn withdraws the route from routing table RT1 on ST 6 and determines that it was a local best route. The DRTM knows that ST 8 and ST 9 also maintain routing table RT1. Therefore, the DRTM creates an Update Route message and broadcasts the Update Route message over the control bus.

When the DRTM on ST 8 receives the Update Route message from ST 6 over the control bus, the DRTM withdraws the route from routing table RT1 on ST 8 and determines that an old local non-best route has become the best route. Because the route is a new local best route, the DRTM creates an Update Route message and broadcasts the Update Route message over the control bus.

Case 6: Old Remote Non-Best Route Becomes Best Route

Continuing from CASE 4, the OSPF protocol running on interface 2 of ST 6 submits a withdrawal of route 192.32.15.0 to the DRTM. The DRTM in turn withdraws the route from routing table RT2 on ST 6 and determines that the withdrawn route was a local best route. The DRTM knows that ST 8 also maintains routing table RT2. Therefore, the DRTM creates an Update Route message and broadcasts the Update Route message over the control bus.

When the DRTM withdraws the local best route from routing table RT2 on ST 6, an old remote non-best route becomes the best route. Because the new best route is a remote best route, the DRTM does not broadcast an Update Route message.

When the DRTM on ST 8 receives the Update Route message from ST 6 withdrawing the route 192.32.15.0, the DRTM withdraws the route from routing table RT2 on ST 8 and determines that the withdrawn route was a remote best route. With the withdrawal of the remote best route, a local non-best route becomes the best route. This situation is covered in CASE 5.

Case 7: Route for an Unsupported Routing Table

Continuing from CASE 1, the DRTM on ST 7 receives the Update Route message from ST 6 over the control bus (event 5). Because ST 7 does not maintain routing table RT1, the DRTM discards the Update Route message.

The flow continues in CASE 3.

In an alternative embodiment of the present invention, each ST card only stores the routes that it will use immediately. Other routes that it receives are discarded. Then, if a best route becomes unusable, the ST card must wait to obtain a substitute route. This approach uses less memory for route storage, but at the expense of slower re-convergence.

Figure 13:
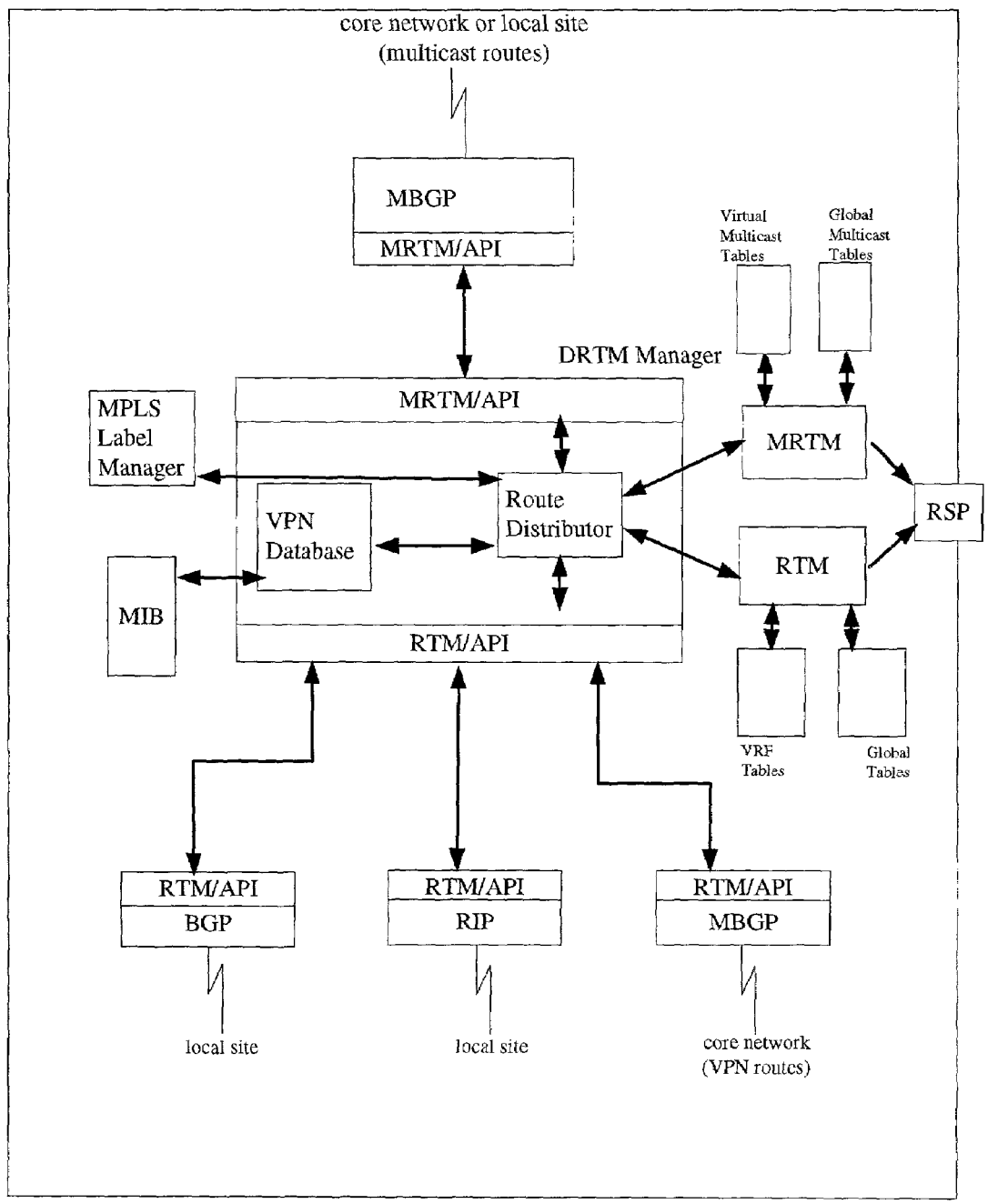
FIG. 13 is a schematic block diagram showing the relationship between the distributed routing table manager and other routing components in accordance with an embodiment of the present invention.

FIG. 13 is a schematic block diagram showing the relationship between the DRTM and other routing components.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the described logic is not limited to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the control plane logic is implemented in software that is executed by multiple processors on the CP and ST cards.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. An information routing system comprising:
   at least one control processor component;
   at least one service termination component;
   control plane logic including box management control logic isolated to the at least one control processor component and routing control logic distributed across the at least one control processor component and the at least one service termination component;
   forwarding plane logic separate from the control plane logic and distributed across the at least one control processor component and the at least one service termination component;
   routing table management logic distributed across the at least one control processor component and the at least one service termination component;
   a control interface for transporting control plane information between the at least one control processor component and the at least one service termination component; and
   a routing fabric separate from the control interface for transporting forwarding plane information between the at least one control processor component and the at least one service termination component.

2. The information routing system of claim 1, wherein the control interface comprises a 1 Gigabit Ethernet backplane bus.

3. The information routing system of claim 1, wherein the routing fabric comprises a 640 Gigabit routing fabric.

4. The information routing system of claim 1, wherein the at least one control processor component comprises:
   a first processor for executing the box management control logic; and
   a second processor for executing the routing control logic.

5. The information routing system of claim 1, wherein the at least one service termination component comprises a processor for executing the routing control logic independently of the forwarding plane logic.

6. The information routing system of claim 1, further comprising:
   at least one fabric component for managing the routing fabric.

7. The information routing system of claim 1, wherein the distributed routing table management logic is operably coupled to learn local and remote routes and to distribute local best routes to peer control processor components and service termination components.

8. The information routing system of claim 7, wherein each peer component stores all routes it receives through the distributed routing table management logic.

9. The information routing system of claim 7, wherein each peer component stores only routes it receives through the distributed routing table management logic that will be immediately used and discards routes that will not be immediately used.

10. An information routing apparatus comprising:
    at least one control processor component;
    at least one service termination component;
    control plane logic including box management control logic isolated to the at least one control processor component and routing control logic distributed across the at least one control processor component and the at least one service termination component;
    forwarding plane logic separate from the control plane logic and distributed across the at least one control processor component and the at least one service termination component;
    routing table management logic distributed across the at least one control processor component and the at least one service termination component;
    a control interface for transporting control plane information between the at least one control processor component and the at least one service termination component; and
    a routing fabric separate from the control interface for transporting forwarding plane information between the at least one control processor component and the at least one service termination component.

11. The information routing apparatus of claim 10, wherein the control interface comprises a 1 Gigabit Ethernet backplane bus.

12. The information routing apparatus of claim 10, wherein the routing fabric comprises a 640 Gigabit routing fabric.

13. The information routing apparatus of claim 10, wherein the at least one control processor component comprises:
    a first processor for executing the box management control logic; and
    a second processor for executing the routing control logic.

14. The information routing apparatus of claim 10, wherein the at least one service termination component comprises a processor for executing the routing control logic independently of the forwarding plane logic.

15. The information routing apparatus of claim 10, further comprising:
    at least one fabric component for managing the routing fabric.

16. The information routing apparatus of claim 10, wherein the distributed routing table management logic is operably coupled to learn local and remote routes and to distribute local best routes to peer control processor components and service termination components.

17. The information routing apparatus of claim 16, wherein each peer component stores all routes it receives through the distributed routing table management logic.

18. The information routing apparatus of claim 16, wherein each peer component stores only routes it receives through the distributed routing table management logic that will be immediately used and discards routes that will not be immediately used.

* * * * *